(No Model.)

J. E. BROWN.
ANIMAL POKE.

No. 494,754.                    Patented Apr. 4, 1893.

Witnesses:                           Inventor,
                                    James E. Brown
                                    By Dewey & Co
                                    Attys

UNITED STATES PATENT OFFICE.

JAMES EWING BROWN, OF FERNDALE, CALIFORNIA.

ANIMAL-POKE.

SPECIFICATION forming part of Letters Patent No. 494,754, dated April 4, 1893.

Application filed December 20, 1892. Serial No. 455,807. (No model.)

*To all whom it may concern:*

Be it known that I, JAMES EWING BROWN, a citizen of the United States, residing at Ferndale, Humboldt county, State of California, have invented an Improvement in Animal-Pokes; and I hereby declare the following to be a full, clear, and exact description of the same.

My invention relates to that class of animal pokes in which the yoke is provided with a pricker plate in front of the face of the animal.

It consists in a suitable yoke or bow provided with fastening straps, a spring strip secured to the top of the yoke or bow, curving upwardly and forwardly over the head of the animal, and thence extending down in front of the median line of the face, and a pricker upon said spring, lying over the animal's nose.

It also consists of an adjustable pricker upon the spring, and a cross-bar above, for horned cattle.

The object of my invention is to provide a simple, easily adjusted and effective animal poke.

Figure 1:
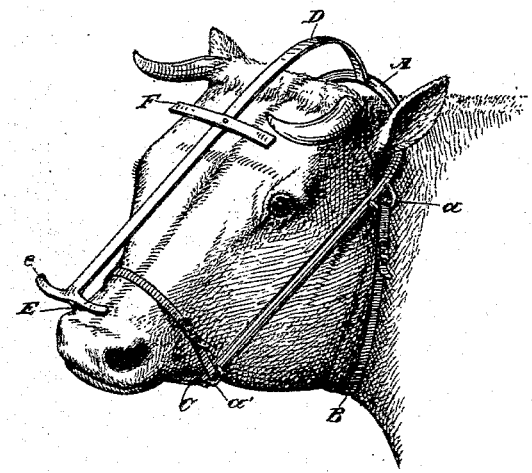
Figure 2:
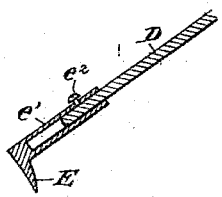

Referring to the accompanying drawings for a more complete explanation of my invention,—Figure 1 is a perspective view of my poke showing its application. Fig. 2 is a sectional detail showing an adjustable pricker.

A is a yoke or bow adapted to fit the neck of an animal. It is provided with loop eyes $a$ for the throat-latch B, and with eyes $a'$ for the nose strap C. By these means the bow or yoke is securely fastened upon the neck of the animal.

D is a spring strip. It is secured at its top to the top of the bow or yoke A. It thence curves upwardly and forwardly over the head of the animal and extends down in front of and separated from the median line of the face of the animal.

Upon the lower end of the spring strip is secured an inwardly extending pricker E, which lies just in front of the animal's nose. Now when the animal attempts to push with his head the spring strip D is forced inwardly and the pricker E comes in contact with his nose, which will have the effect of diverting him from his present purpose.

Though the pricker may be secured to the spring strip in any suitable manner, it is best done by forming it on or with a short cross bar $e$ which will better insure contact with an obstructing object.

To render the pricker adjustable to different animals it is formed or provided with a sleeve $e'$ which slides upon the spring strip and may be set in required position by a set screw $e^2$.

For horned cattle, I secure to the spring strip D, in a line opposite the horns, the cross bar F. Its effect is to insure contact and the forcing in of the spring strip when the animal attempts to use his horns on a fence or gate.

The single spring strip extending down the face of the animal is simple in its nature, entirely effective, and avoids complications.

Having thus described my invention, what I claim as new, and desire to secure by Letters Patent, is—

1. An animal poke consisting of a neck yoke or bow, a spring strip secured to the top of the yoke or bow, and thence curving forwardly over the animal's head, and extending downwardly in front of his face, and a pricker upon the lower end of the strip in front of the animal's nose, substantially as herein described.

2. An animal poke consisting of a neck yoke or bow, a spring strip secured to the top of the yoke or bow and thence curving forwardly over the animal's head, and extending downwardly in front of his face, a cross-bar on the lower end of said strip in front of the animal's nose, and a pricker extending inwardly from said cross-bar, substantially as herein described.

3. An animal poke consisting of a neck yoke or bow, a spring strip secured to the top of the yoke or bow and thence curving forwardly over the animal's head and extending downwardly in front of his face, a sliding sleeve with set screw on the lower end of said spring strip and an inwardly extending pricker on said sleeve, substantially as herein described.

4. An animal poke consisting of a neck yoke or bow, a spring strip secured to the top of the yoke or bow and thence curving forwardly over the animal's head and extending downwardly in front of his face, an inwardly projecting pricker upon the lower end of said spring strip and a cross-bar upon said strip opposite the horns of the animal, substantially as herein described.

In witness whereof I have hereunto set my hand.

JAMES EWING BROWN.

Witnesses:
SILVIO COMISTO,
C. F. RACKLIFF.